United States Patent
Kraus

(10) Patent No.: US 10,424,336 B1
(45) Date of Patent: Sep. 24, 2019

(54) TOP COVER MOUNTED ENVIRONMENTAL CONTROL MODULE FOR HARD DISK DRIVES

(71) Applicant: Seagate Technology LLC, Cupertino, CA (US)

(72) Inventor: Maxwell Reese Kraus, Clear Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/996,943

(22) Filed: Jun. 4, 2018

(51) Int. Cl.
  *G11B 33/14* (2006.01)
  *G11B 25/04* (2006.01)

(52) U.S. Cl.
  CPC .......... *G11B 25/043* (2013.01); *G11B 33/14* (2013.01); *G11B 33/146* (2013.01); *G11B 33/1453* (2013.01); *G11B 33/1466* (2013.01); *G11B 33/1486* (2013.01)

(58) Field of Classification Search
  None
  See application file for complete search history.

(56) References Cited

U.S. PATENT DOCUMENTS

| | | | | |
|---|---|---|---|---|
| 4,599,670 | A * | 7/1986 | Bolton, IV | G11B 33/14 360/137 |
| 5,590,001 | A * | 12/1996 | Ino | G11B 25/043 360/97.18 |
| 6,238,467 | B1 * | 5/2001 | Azarian | B01D 46/0023 360/99.17 |
| 7,306,659 | B2 * | 12/2007 | Gorton | B01D 46/0032 360/97.17 |
| 7,362,540 | B2 * | 4/2008 | Repphun | G11B 33/121 360/97.18 |
| 8,699,179 | B1 | 4/2014 | Golgolab et al. | |
| 8,760,797 | B1 * | 6/2014 | Beatty | G11B 33/1486 360/97.12 |
| 8,861,127 | B2 * | 10/2014 | Brown | H05K 5/0213 360/97.16 |
| 8,885,289 | B2 * | 11/2014 | Brown | G11B 25/043 360/97.13 |
| 8,885,290 | B1 | 11/2014 | Gustafson et al. | |
| 8,908,319 | B1 | 12/2014 | Gustafson et al. | |
| 9,302,795 | B1 * | 4/2016 | Beatty | B65D 81/266 |
| 9,418,710 | B1 * | 8/2016 | Choe, Jr. | G11B 33/146 |
| 10,134,447 | B2 * | 11/2018 | Beatty | B65D 81/266 |

(Continued)

*Primary Examiner* — William J Klimowicz
(74) *Attorney, Agent, or Firm* — Kagan Binder, PLLC

(57) ABSTRACT

An environmental control module for use in a hard disk drive, the environmental control module including a body member having an outer peripheral wall defining an inner body member area, the peripheral wall comprising a top edge and a bottom edge, a dividing wall separating at least a portion of the inner body member area into a first section and a second section, and a bottom surface extending from the bottom edge of the outer peripheral wall and comprising an opening into the first section of the inner body member area. The module further includes a first permeable member covering the opening in the bottom surface, a desiccant positioned within the second section of the inner body member area, and a non-permeable member covering the second section of the inner body member.

15 Claims, 4 Drawing Sheets

(56) References Cited

U.S. PATENT DOCUMENTS

2004/0013866 A1\* 1/2004 Sasaki .................... B01D 53/02
  428/304.4
2013/0114163 A1\* 5/2013 Brown ............... B01D 53/0407
  360/97.22

\* cited by examiner

TOP COVER MOUNTED ENVIRONMENTAL CONTROL MODULE FOR HARD DISK DRIVES

BACKGROUND

Computers generally utilize disk drives for data storage and retrieval, such as magnetic recording hard disk drives that include a head assembly for reading and/or writing data on a rotatable magnetic disk. In such systems, the head assembly is typically attached to an actuator arm by a head suspension assembly (HSA) comprising a head suspension and an aerodynamically designed slider onto which a read/write head is provided. When the head is positioned over a spinning disk during usage, the head configuration is at least partially controlled by balancing a lift force that is caused by an air bearing generated by the spinning disk and acting upon the slider, and an opposite bias force of the head suspension. In operation, the slider and head are designed to "fly" over the spinning disk at high speeds and at precisely determined distances from the disk surface. The slider can be considered to be spaced from the disk by a gas lubrication film that can be referred to as an "air bearing," as the lubricant gas is typically air.

Recently, some disk drive enclosures are being designed for use with helium rather than air, which provides a number of advantages. For one advantage, drives filled with helium experience less friction than those filled with air, such that the disks and the arms to which the sliders are attached suffer less turbulence. With the decreased turbulence, thinner disks can be spaced closer to each other in a disk drive stack, thereby increasing the storage capacity of the disk drive. In addition, the lower levels of friction in helium drives can result in decreased power consumption and lower operating temperatures. In some cases, the lower turbulence can also reduce the amount of noise produced by the drive.

In order to maintain a volume of helium in a sealed disk drive enclosure, the enclosure will generally be hermetically sealed. Such a sealing of the enclosure is important to maintain the thickness of the helium acting as a gas lubrication film between the head and the disk, which impacts the overall performance of the head. However, such sealing can be difficult to accomplish since any port or opening in the enclosure that provides communication with the inner area of the enclosure provides a potential leak point through which helium can escape. One such opening and potential leakage point is a port in the cover through which air is evacuated from the enclosure and helium is introduced to the enclosure. There is therefore a need for a disk drive enclosure having a reliable configuration for the introduction of helium into its internal area and for minimizing or eliminating helium leakage.

SUMMARY

Aspects of the invention described herein are directed to an environmental control module that is particularly applicable to helium drives. In particular, an environmental control module is provided for use in a hard disk drive, the environmental control module comprising: a body member comprising: an outer peripheral wall defining an inner body member area, the peripheral wall comprising a top edge and a bottom edge; a dividing wall separating at least a portion of the inner body member area into a first section and a second section; and a bottom surface extending from the bottom edge of the outer peripheral wall and comprising an opening into the first section of the inner body member area. The module further includes a first permeable member covering the opening in the bottom surface; a desiccant positioned within the second section of the inner body member area; and a non-permeable member covering the second section of the inner body member. The environmental control module may further include a second permeable member positioned between the desiccant and the non-permeable member.

The top edge of the outer peripheral wall may comprise an adhesive layer, and/or the outer peripheral wall may comprise a first height, and the dividing wall may comprise a second height that is less than the first height. The non-permeable member may comprise aluminum foil, for example. The desiccant will generally be hermetically sealed within the second section of the inner body member.

In accordance with the invention, the environmental control module of the invention can be used in combination with a hard disk drive enclosure comprising a top cover attached to a base member. The top cover of the enclosure has an inner surface, wherein the top edge of the peripheral wall of the environmental control module can be hermetically sealed to the inner surface of the top cover. The top cover may further comprise an aperture, wherein the second section of the environmental control module is positioned adjacent to the aperture. In embodiments, the hard disk drive further comprises a flex clamp, wherein the bottom surface of the body member is spaced from the flex clamp.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

The methods and features described herein are applicable to hard disk drives, such as those including an enclosure that is filled with an inert gas, such as helium. However, the configurations and methods described herein are not limited to being filled with an inert gas, and may instead be filled with other gases, such as air.

Figure 1:
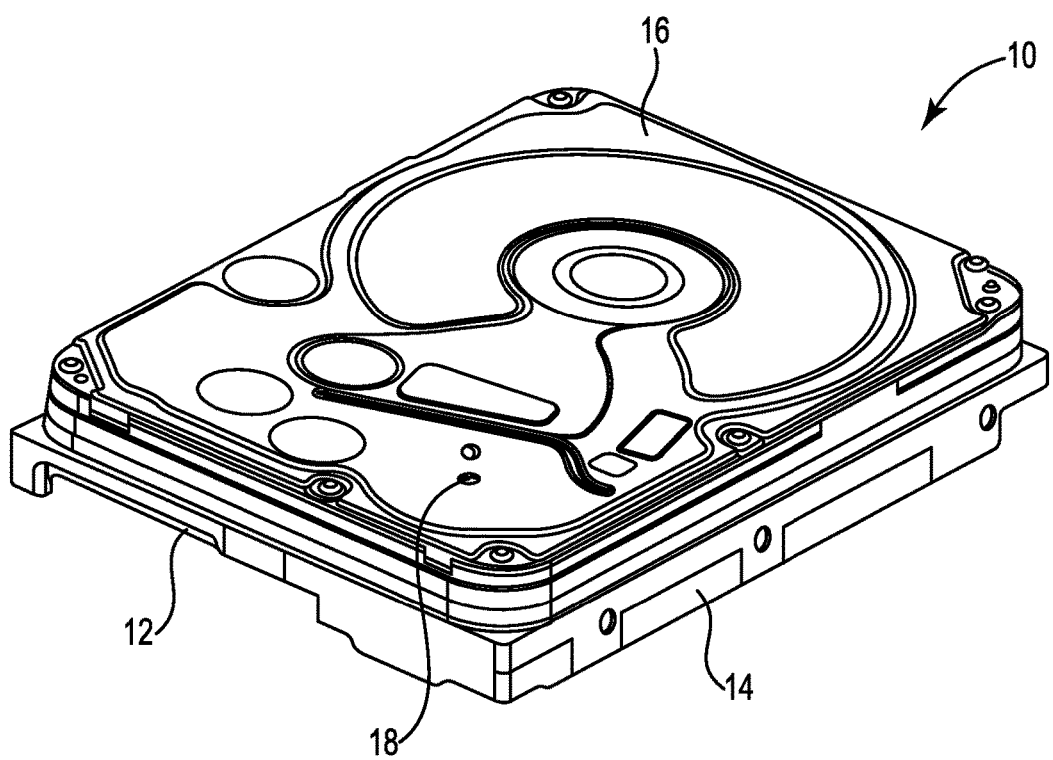
FIG. 1 is a perspective view of an embodiment of an outer enclosure of a disk drive.

Referring now to the Figures, and initially to FIG. 1, a hard disk drive 10 is illustrated, which generally includes an outer case or enclosure 12 that comprises a base member 14 to which a top cover 16 is attached. The base member 14 can include a wide variety of configurations, but in typical configurations will include an inner cavity (not visible) in which at least one magnetic storage disk is located, wherein the disk is rotatable about an axis. The cavity can further include one or more printed circuit boards, an actuation motor (e.g., a voice coil motor), an actuator arm, a suspension assembly that includes a load beam, a slider carrying a transducing or read/write head, and other disk drive components. The slider is supported by suspension assembly, which in turn is supported by an actuator arm. Together, the actuator arm, suspension assembly and slider form a head stack assembly (HSA). The actuation motor is configured to pivot the actuator arm about an axis in order to sweep the suspension and the slider in an arc across a surface of one of the rotating disks with the slider "sliding" or "flying" across the disk on a cushion of air, often referred to as an air bearing. The read/write head carried by the slider can be positioned relative to selected concentric data tracks of one of the disks by a piezoelectric microactuator, for example. A stack of co-rotating disks can be provided with additional actuator arms, suspension assemblies, and sliders that carry read/write heads for reading and writing at top and bottom surfaces of each disk in the stack.

Top cover 16 is mounted to the base member 14 and these components are hermetically sealed to each other along any junction points or areas in order to minimize or prevent the migration of gases, such as helium, from the enclosure. Top cover 16 can include any number of contours that are designed to accommodate the internal components within the outer case 12. Top cover 16 further includes a port or opening 18 through which air, helium, and or other gases can be transferred into the inner area of the enclosure.

Figure 2:
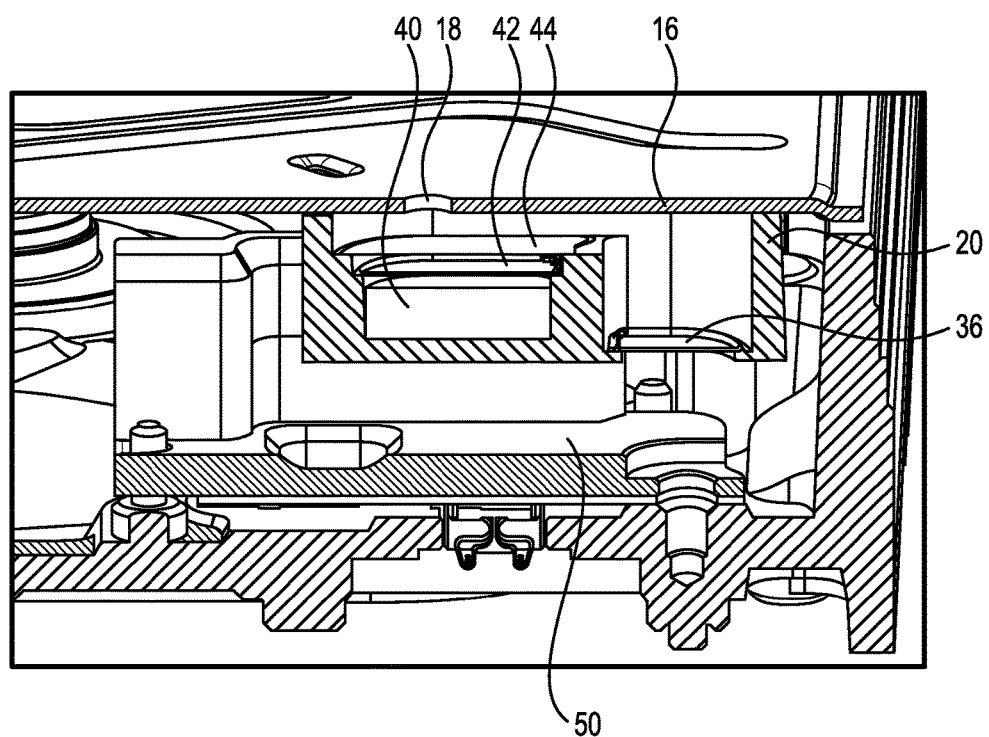
FIG. 2 is a cross-sectional view of a portion of a disk drive including an embodiment of an environmental control module or insert.

Referring now to FIG. 2, a portion of the inner area of a disk drive 10 in the area of the port or opening 18 is illustrated, which includes an environmental control module or insert 20. Insert 20 is mounted or attached to the inner surface of the top cover 16, adjacent to the port or opening 18. This insert 20 is considered to be a top cover mounted, hermetically sealed helium component that can be used with current hard disk drive configurations (that is, to replace currently environmental control modules provided in certain disk drives) or can be particularly designed for other disk drive configurations. The insert 20 can reduce head stack assembly off-track motion by breaking the modal transmission path from the top cover to the head stack assembly, as will be described below in further detail.

Figure 3:
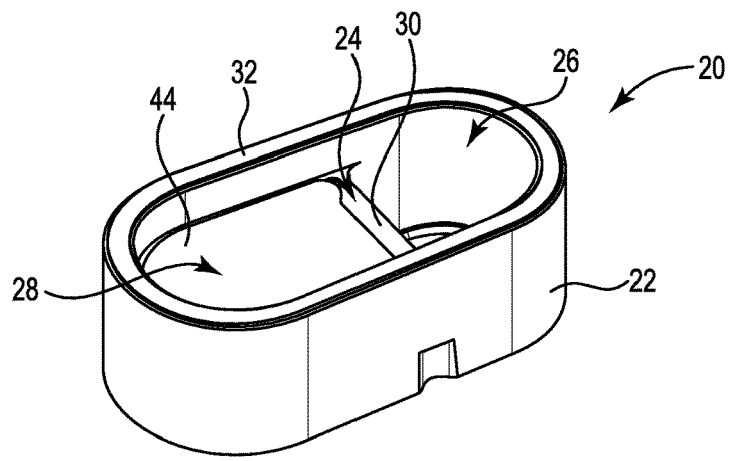
FIG. 3 is a perspective view of the environmental control module or insert shown in FIG. 2.
Figure 4:
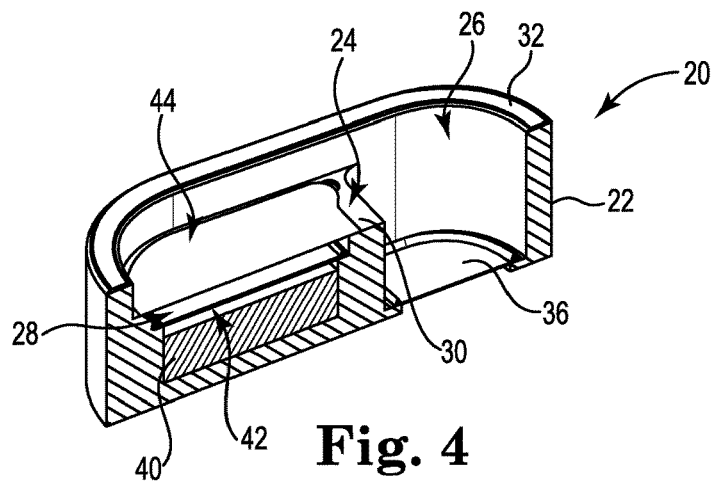
FIG. 4 is a partial cross-sectional perspective view of the environmental control module or insert shown in FIG. 2.
Figure 5:
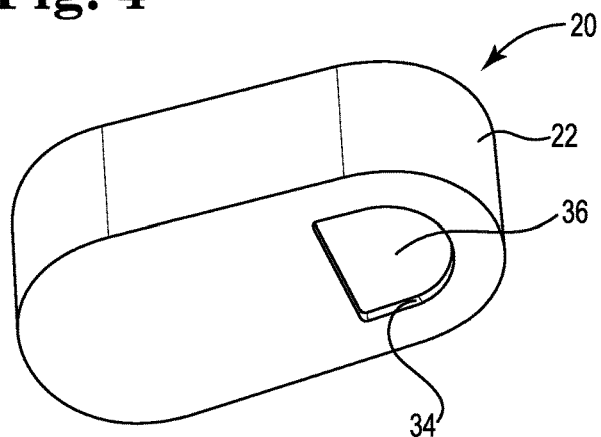
FIG. 5 is a bottom perspective view of the environmental control module or insert shown in FIG. 2.

With additional reference to FIGS. 3 through 5, insert 20 includes a body member 22, which in this case is illustrated as having a race track perimeter shape, but may instead have a different outer perimeter shape, such as circular, square, rectangular, triangular, and the like, and may include sides that are straight, curved, or a combination thereof. The shape is generally chosen to fit into a space in the disk drive 10 in which it will be positioned, and can vary from the illustrated embodiment. Body member 22 may be made of plastic, metal, or a combination these and/or other materials.

Body member 22 includes a divider 24 that divides a bottom portion of the inner area of the body member into first and second sections 26, 28. Divider 24 does not extend along the entire height of the body member 22, but instead terminates at a divider top surface 30 that is located below a top surface 32 of the body member 22 such that the top area of the body member is not divided into two sections. Top surface 32 of the body member 22 is provided with an adhesive material or layer for secure attachment to the bottom surface of the top cover 16. The adhesive may be added during production of the insert 20 and include a release liner (not shown) or may be provided as a separate material that is added to the top surface prior to attachment of the insert 20 to the bottom surface of top cover 16. In any case, the adhesive both attaches the body member 22 to the internal top cover surface and creates a boundary between the internal portion of the insert 20 and the internal components of the hard disk drive. In this way, the particulate or contamination present from the evacuation and filling processes is prevented from spreading to the internal areas of the drive. This mounting of the insert 20 to the bottom of the top cover 16 can optionally space the bottom of the insert from the top of a head stack assembly flex clamp 50, as shown. However, it is contemplated that an insert can be tall enough to both be adhered to the bottom surface of the top cover and in contact with the flex clamp and/or another disk drive component.

First section 26 of the inner area of the body member 22 includes a bottom opening 34 with a first permeable member 36 sealed to cover the opening 34. The first permeable member 36 may be a material such as polytetrafluoroethylene (PTFE) that allows for the passing of helium or other gases through it, as desired.

Second section 28 of the inner area of the body member 22 includes an inner chamber in which a volume of desiccant 40 is located. The desiccant 40 may be provided as a solid tablet having a shape and size to fit relatively closely within the inner chamber of second section 28, or may be smaller than the inner chamber of second section 28. Alternatively, the desiccant 40 may be provided as more than one piece, such as multiple desiccant pieces and/or more granular pieces of desiccant material. Desiccant 40 can consist of any combination of silica gel, carbon, molecular sieve, and/or other materials. Further, desiccant 40 may optionally be provided with a clearance feature or hole for accommodating the insertion of a piercing pin, for example.

The insert 20 may further be provided with a second permeable member 42 sealed to cover the desiccant 40 within the inner chamber of second section 28. The second permeable member 42 may be a material that allows for the passing of helium or other gases through it, as desired, such as polytetrafluoroethylene (PTFE), for example.

A third sealing member 44 is positioned above the second permeable member 42, and is sealed to the inner area of the body member 22 and the divider 24 to provide a hermetic seal for the desiccant 40. Thus, the third sealing member 44 comprises a impermeable material, such as aluminum foil or a different impermeable layer such as a polymer layer, which prevents ambient moisture from reaching the desiccant 40. In operation, the desiccant 40 is thereby hermetically sealed until and unless punctured by a piercing pin, which may be used during air evacuation and helium filling operations.

Once the insert 20 is positioned in its desired location in a hermetically sealed disk drive 10, it may be desired to fill the drive with helium. At this point, the desiccant 40 is sealed with the third sealing member 44 such that transmission of water or other substances is limited or impossible. Next the third sealing member 44 may be punctured, such as with a piercing pin that is extended through the port or opening 18 in top cover 16. The newly created hole allows the desiccant 40 to communicate with the internal volume of the drive by adsorbing and desorbing moisture through the first permeable member 36, which is sealed to the bottom of the insert 20, as described above. In particular, the desiccant can adsorb and desorb water vapor through the punctured third sealing member 44, around the walls of the body member 22, through the first permeable member 36, and through the second permeable member 42. At this point, the piercing pin can be retracted and air can be evacuated by the use of a vacuum. Once this is completed, the desired amount of helium can be added to fill the enclosure, and then the filling nozzle can be retracted.

The size of the environmental control module or insert 20 can be varied to accommodate different types and volumes of desiccants and to fit into different sizes and configurations of disk drives. The relative sizes of the first and second sections 26, 28 and their respective permeable members can also be varied, such as to provide more or less desiccant in the insert 20.

Figure 6:
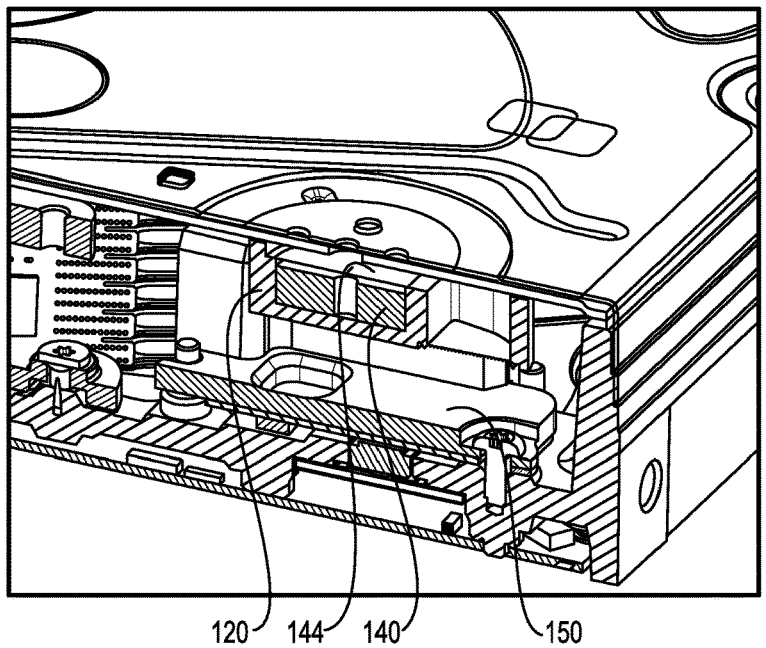
FIG. 6 is a cross-sectional perspective view of a portion of a disk drive including an embodiment of an environmental control module or insert.
Figure 7:
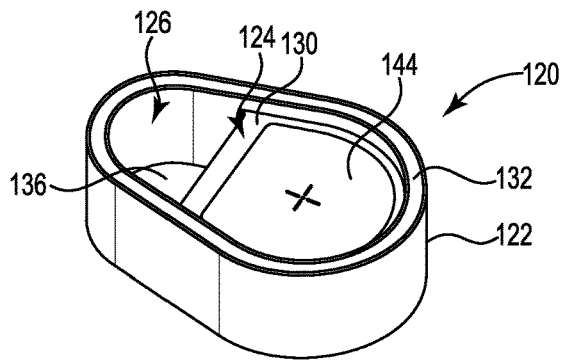
FIG. 7 is a perspective view of the environmental control module or insert shown in FIG. 6.
Figure 8:
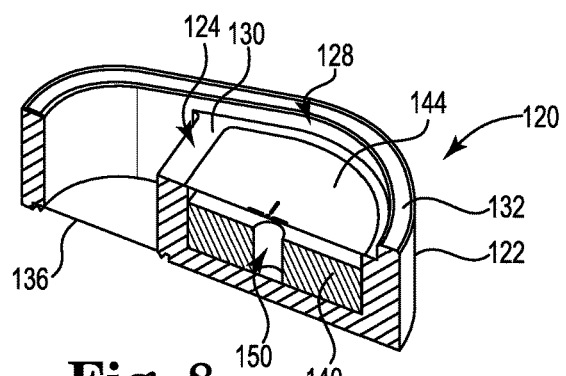
FIG. 8 is a partial cross-sectional perspective view of the environmental control module or insert shown in FIG. 7.

Referring now to FIGS. 6 through 8, a hard disk drive of the type illustrated in FIG. 1 includes another embodiment of an environmental control module or insert 120 that is mountable to the inner surface of the top cover 16, adjacent to the port or opening 18. This insert 120 is considered to be a top cover mounted, hermetically sealed helium component that can be used with current hard disk drive configurations (that is, to replace currently environmental control modules provided in certain disk drives) or can be particularly designed for other disk drive configurations. Insert 120 includes a body member 122, which in this case is illustrated as having teardrop perimeter shape. Body member 122 may be made of plastic, metal, or a combination these and/or other materials.

Body member 122 includes a divider 124 that divides a portion of the inner area of the body member into first and second sections 126, 128. Divider 124 does not extend along the entire height of the body member 122, but instead terminates at a divider top surface 130 that is located below a top surface 132 of the body member 122 such that the top area of the body member is not divided into two sections. Top surface 132 of the body member 122 is provided with an adhesive material or layer for secure attachment to the bottom surface of the top cover 16. The adhesive may be added during production of the insert 120 and include a release liner (not shown) or may be provided as a separate material that is added to the top surface prior to attachment of the insert 120 to the bottom surface of top cover 16. In any case, the adhesive both attaches the body member 122 to the internal top cover surface and creates a boundary between the internal portion the insert 120 and the internal components of the hard disk drive. In this way, the particulate or contamination present from the evacuation and filling processes is prevented from spreading to the internal areas of the drive. This mounting of the insert 120 to the bottom of the top cover 16 can optionally space the bottom of the insert from the top of a head stack assembly flex clamp 150, as shown.

First section 126 of the inner area of the body member 122 includes a bottom opening with a permeable member 136 sealed to cover the opening. The permeable member 136 may be a material such as polytetrafluoroethylene (PTFE) that allows for the passing of helium or other gases through it, as desired.

Second section 128 of the inner area of the body member 122 includes an inner chamber in which a volume of desiccant 140 is located. The desiccant 140 may be provided as a solid tablet having a shape and size to fit somewhat closely within the inner chamber of second section 128, or may be smaller than the inner chamber of second section 128. Alternatively, the desiccant 140 may be provided as more than one piece, such as may be provided by granular pieces of desiccant material, for example. Desiccant 140 can consist of any combination of silica gel, carbon, molecular sieve, and/or other materials. Desiccant 140 may optionally be provided with a clearance feature or hole 150 for accommodating the insertion of a piercing pin, for example.

A second sealing member 144 is positioned above desiccant 144, and is sealed to the inner portion of the body member 122 and the divider 124 to provide a hermetic seal for the desiccant 140. Thus, the second sealing member 144 comprises an impermeable material, such as aluminum foil or a different impermeable layer such as a polymer layer, which prevents ambient moisture from reaching the desiccant 140. In operation, the desiccant 140 is thereby hermetically sealed until and unless punctured by a piercing pin.

Once the insert 120 is positioned in its desired location in a hermetically sealed disk drive 10, it may be desired to fill the drive with helium. At this point, the desiccant 140 is sealed with the second sealing member 144 such that transmission of water or other substances is limited or impossible. Next the second sealing member 144 may be punctured, such as with a piercing pin that is extended through the port or opening 18 in top cover 16. The newly created hole allows the desiccant 140 to communicate with the internal volume of the drive by adsorbing and desorbing moisture through the first permeable member 136, which is sealed to the bottom of the insert 120, as described above. In particular, the desiccant can adsorb and desorb water vapor through the punctured second sealing member 144, around the walls of the body member 122, and through the first permeable member 136. At this point, the piercing pin can be retracted and air can be evacuated by the use of a vacuum. Once this is completed, the desired amount of helium can be added to fill the enclosure, and then the filling nozzle can be retracted.

It has been shown based on HDA simulations that decoupling the top cover from the head stack assembly flex clamp can reduce off-track motion by up to 70%. That is, environmental control modules that are inserted into an opening in the disk drive but are not attached or adhered to the top cover of the disk drive, as in current commercially available disk drives, provide for a transmitting modal frequencies from the top cover to the head stack assembly by coupling the top cover to the flex clamp, through a PCCA loop, and into the head stack assembly. This occurs because the environmental control modules found in current commercially available disk drives contact both the top cover and flex clamp. The environmental control modules provided herein break the transmission path since the module or insert is not in contact with the flex clamp since the module is mounted to the top cover. By changing this transmission path for motion, the head stack assembly off-track motion can be reduced by up to 70%.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. An environmental control module for use in a hard disk drive, the environmental control module comprising:
   a body member comprising:
      an outer peripheral wall defining an inner body member area, the peripheral wall comprising a top edge and a bottom edge;

a dividing wall separating at least a portion of the inner body member area into a first section and a second section; and a bottom surface extending from the bottom edge of the outer peripheral wall and comprising an opening into the first section of the inner body member area;

wherein the dividing wall extends from the bottom surface toward the top edge of the peripheral wall;

a first permeable member covering the opening in the bottom surface;

a desiccant positioned within the second section of the inner body member area; and a non-permeable member covering the second section of the inner body member area.

2. The environmental control module of claim 1, further comprising a second permeable member positioned between the desiccant and the non-permeable member.

3. The environmental control module of claim 1, wherein the top edge of the outer peripheral wall comprises an adhesive layer.

4. The environmental control module of claim 1, wherein the outer peripheral wall comprises a first height defined as a distance between the top edge and the bottom edge of the peripheral wall, and wherein the dividing wall comprises a second height that is less than the first height.

5. The environmental control module of claim 1, wherein the non-permeable member comprises aluminum foil.

6. The environmental control module of claim 1, in combination with a hard disk drive enclosure comprising a top cover attached to a base member.

7. The combination of claim 6, wherein the top cover of the enclosure comprises an inner surface, and wherein the top edge of the peripheral wall of the environmental control module is hermetically sealed to the inner surface of the top cover.

8. The combination of claim 7, wherein the top cover further comprises an aperture, and wherein the second section of the environmental control module is positioned adjacent to the aperture.

9. The combination of claim 7, wherein the hard disk drive further comprises a flex clamp, and wherein the bottom surface of the body member is spaced from the flex clamp.

10. An environmental control module for use in a hard disk drive, the environmental control module comprising:

a body member comprising:

an outer peripheral wall defining an inner body member area, the peripheral wall comprising a top edge and a bottom edge;

a dividing wall separating at least a portion of the inner body member area into a first section and a second section; and a bottom surface extending from the bottom edge of the outer peripheral wall and comprising an opening into the first section of the inner body member area;

a first permeable member covering the opening in the bottom surface;

a desiccant positioned within the second section of the inner body member area; and a non-permeable member covering the second section of the inner body member area, wherein the desiccant is hermetically sealed within the second section of the inner body member area.

11. A disk drive comprising:

a disk drive enclosure comprising a top cover hermetically attached to a base member; and an environmental control module hermetically sealed to an inner surface of the top cover of the enclosure, the environmental control module comprising:

a body member comprising:

an outer peripheral wall defining an inner body member area, the peripheral wall comprising a top edge and a bottom edge;

a dividing wall separating at least a portion of the inner body member area into a first section and a second section; and a bottom surface extending from the bottom edge of the outer peripheral wall and comprising an opening into the first section of the inner body member area;

a first permeable member covering the opening in the bottom surface;

a desiccant positioned within the second section of the inner body member area; and a non-permeable member covering the second section of the inner body member area.

12. The disk drive of claim 11, wherein the top cover further comprises an aperture, and wherein the second section of the environmental control module is positioned adjacent to the aperture.

13. The disk drive of claim 11, further comprising a second permeable member positioned between the desiccant and the non-permeable member.

14. The disk drive of claim 11, wherein the desiccant is hermetically sealed within the second section of the inner body member area.

15. The disk drive of claim 11, further comprising a flex clamp within the disk drive enclosure, wherein the bottom surface of the body member is spaced from the flex clamp.

* * * * *